(12) United States Patent
Yoho et al.

(10) Patent No.: US 11,176,274 B2
(45) Date of Patent: Nov. 16, 2021

(54) PROTECTING USER DATA

(71) Applicant: INTERNATIONAL BUSINESS MACHINES CORPORATION, Armonk, NY (US)

(72) Inventors: Adam Yoho, Pflugerville, TX (US); David Yu Chang, Austin, TX (US); Wilalberto Rodriguez, Austin, TX (US); Paul William Bennett, Round Rock, TX (US); Zechariah Hein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 16/423,678

(22) Filed: May 28, 2019

(65) Prior Publication Data
US 2020/0380164 A1 Dec. 3, 2020

(51) Int. Cl.
*G06F 21/62* (2013.01)
*H04L 29/06* (2006.01)

(52) U.S. Cl.
CPC .......... *G06F 21/6254* (2013.01); *H04L 63/08* (2013.01); *G06F 2221/2115* (2013.01); *G06F 2221/2117* (2013.01)

(58) Field of Classification Search
None
See application file for complete search history.

(56) References Cited

U.S. PATENT DOCUMENTS

| 5,987,440 | A | 11/1999 | O'Neil et al. |
| 7,353,532 | B2 | 4/2008 | Duri et al. |
| 10,749,681 | B2 * | 8/2020 | Andrade ............... H04L 9/0866 |

(Continued)

FOREIGN PATENT DOCUMENTS

| CN | 112016117 A | 12/2020 |
| EP | 2284784 B1 | 12/2017 |
| WO | 2017209758 A1 | 12/2017 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Kaveh Abrishamkar
(74) *Attorney, Agent, or Firm* — Dmitry Paskalov (57) ABSTRACT

A method, computer system, and computer program product for protecting user data while performing third-party account registration. The method may include receiving, from a third party, a request for personal data of a user. The method may request the user to authenticate the request for personal data. In response to receiving from the user the authentication, the method may include providing the third party the personal data of the user. A portion of the personal data of the user that is provided to the third party may be altered and may be mapped to the user. The method may store identifying information about the third party. The method may also include receiving, from the user, a parameter respecting use of the portion of the personal data that is altered. The parameter may limit the third party from obtaining information from the portion of the personal data that is altered.

20 Claims, 7 Drawing Sheets

(56) References Cited

U.S. PATENT DOCUMENTS

| | | | |
|---|---|---|---|
| 2010/0095372 | A1 | 4/2010 | Hodgkinson et al. |
| 2012/0072979 | A1 | 3/2012 | Cha et al. |
| 2014/0019367 | A1 | 1/2014 | Khan |
| 2014/0068722 | A1 | 3/2014 | Hayat |
| 2015/0121373 | A1* | 4/2015 | Black .................. G06F 9/45533 718/1 |
| 2017/0161439 | A1* | 6/2017 | Raduchel .............. H04W 12/06 |
| 2018/0144153 | A1* | 5/2018 | Pead .................... G06F 21/6245 |
| 2019/0180311 | A1* | 6/2019 | Chan .................... G06Q 30/0236 |
| 2019/0295162 | A1* | 9/2019 | Wang ................... H04L 9/3247 |
| 2019/0303920 | A1* | 10/2019 | Balaraman ............ H04L 9/0637 |
| 2020/0153793 | A1* | 5/2020 | Kikinis ................. H04L 63/126 |
| 2020/0273097 | A1* | 8/2020 | Nordyke ................ H04L 67/12 |
| 2020/0320222 | A1* | 10/2020 | Zhou ..................... H04L 9/3247 |

OTHER PUBLICATIONS

Mont et al., "Towards Accountable Management of Identity and Privacy: Sticky Policies and Enforceable Tracing Services", HP Laboratories Bristol, HPL-2003-49, Mar. 19, 2003, 17 pages.

Weerasinghe et al., "Patient Privacy Protection Using Anonymous Access Control Techniques", Methods of Information in Medicine, vol. 47, No. 3, Mar. 2008, pp. 235-240.

\* cited by examiner

PROTECTING USER DATA

BACKGROUND

Embodiments of the present invention relate generally to a method, system and computer program for protecting user data while performing third-party account registration.

User personal data, such as the user's name, address, phone number, email address, or any other information may be important to the user. Oftentimes, the user may not wish to use the user's personal data to create a third-party account registration. The user may wish to use an alias when performing third-party account registration.

BRIEF SUMMARY

An embodiment of the present invention may include a method, computer system, and computer program product for protecting user data while performing third-party account registration. The method may include receiving, from a third party, a request for personal data of a user. The method may request the user to authenticate the request for personal data. In response to receiving from the user the authentication, the method may include providing the third party the personal data of the user. A portion of the personal data of the user that is provided to the third party may be altered and may be mapped to the user. The method may store identifying information about the third party. The method may also include receiving, from the user, a parameter respecting use of the portion of the personal data that is altered. The parameter may limit the third party from obtaining information from the portion of the personal data that is altered.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for protecting user personal data while performing third-party account registration. In an embodiment of the present invention, a user may use an identity provider to create an alias and store the alias with the identity provider. Instead of using the user's personal data, such as the user's real name and e-mail address, the user may use the alias, stored with the identity provider, to create an account with a third-party. The user may set up one alias and use that alias for all third-party registrations. The user may set up multiple number of aliases and use each alias for certain third-party registrations. Alternatively, the user may set up multiple number of aliases and use more than one alias to create a third-party registration to the same third-party. The creation of aliases may be helpful when the user is trying to protect the user's personal data from potential security breaches.

A problem with using the user's personal data to set up a third-party registration is the fact that the user's personal data may be leaked during a security breach of that third-party. This security breach may cause the user's personal data to be stolen and used in an unauthorized fashion. Accordingly, at least some of the embodiments described herein provide a technical solution to the problem of a security breach described above with respect to protecting the user's personal data. Specifically, some embodiments described herein provide a method of protecting the user's personal data during a third-party account registration.

Reference will now be made in detail to the embodiments of the present invention, examples of which are illustrated in the accompanying drawings, wherein like reference numerals refer to like elements throughout. Embodiments of the invention are generally directed to using a key management server to protect visible content.

Figure 1:
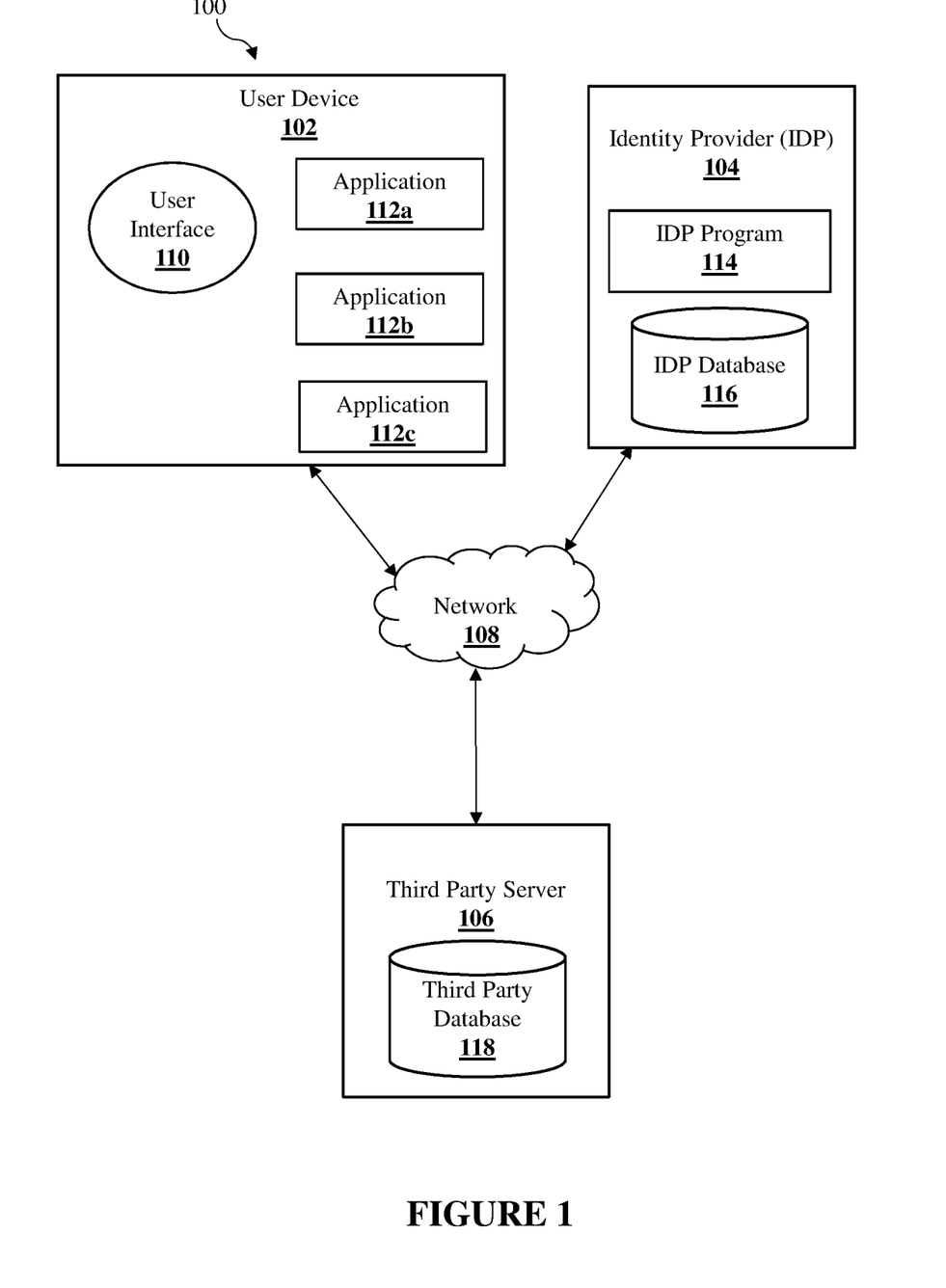
FIG. 1 is a schematic block diagram illustrating a system for protecting user data while performing third-party account registration, in accordance with an embodiment of the invention.

Referring to FIG. 1, a system 100 for protecting user personal data while performing third-party account registration is illustrated, in accordance with an embodiment of the present invention. In an example embodiment, system 100 may include a user device 102, an identity provider (IDP) 104, and a third-party server 106, all connected via one or more networks 108.

In the example embodiment, the network 108 is the Internet, representing a worldwide collection of networks and gateways to support communications between devices connected to the Internet. The network 108 may include, for example, wired, wireless, or fiber optic connections. In alternative embodiments, the network 108 may be implemented as an intranet, a local area network (LAN), or a wide area network (WAN). In general, the network 108 can be any combination of connections and protocols that will support communications between the user device 102, the IDP 104, and the third-party server 106. The network 108 may be an example of a communications network 1200 illustrated in FIG. 5.

The user device 102 may include a user interface 110, and applications 112a, 112b, 112c. In the example embodiment, the user device 102 may be a desktop computer, a notebook, a laptop computer, a tablet computer, a handheld device, a smart-phone, a cellular phone, a landline phone, a thin client, or any other electronic device, computing system, wired or wireless device capable of receiving and sending content to and from other computing devices, such as the IDP 104 and the third-party server 106 via the network 108. While only a single user device 102 is depicted, it can be appreciated that any number of user devices may be part of the system 100. The user device 102 is described in more detail with reference to FIG. 5.

The user interface 110 may include components used to receive input from the user on the user device 102 and transmit the input to an IDP program 114 residing on the IDP 104. The user interface 110 may receive information from the IDP program 114 and display the information to the user on the user device 102. The user interface 110 may also receive input from the user on the user device 102 and transmit the user input to the third-party server 106, or conversely receive information from the third-party server 106 and display the information to the user on the user device 102. In an example embodiment, the user interface 110 may receive input, such as but not limited to, textual, visual, or audio input received from a physical input device, such as but not limited to, a keypad, mouse, and/or a microphone.

The applications 112 may be associated with third-party services. As such, the applications 112 may be online social network or online messaging applications such as, but not limited to, social media applications, email applications, and instant messaging applications, etc. Examples of such applications 112a, 112b, 112c may be Twitter®, Facebook®, Snapchat®, Instagram®, LinkedIn®, IBM® Connections, Microsoft Outlook®, Gmail®, Lotus Notes®, Pinterest®, etc. The applications 112 may also be retail store applications or other business applications, such as banking applications. While three applications 112 are illustrated, it can be appreciated that any number of applications may be part of the system 100 including less than three or more than three depending on the user.

The IDP 104 may include the IDP program 114 and an IDP database 116. The IDP 104 may be a remote server connected to the user device 102 and the third-party server 106 via the network 108. Alternatively, the IDP 104 may reside on the user device 102. The IDP program 114 may be a program capable of classifying which third-party service the user is initially registering for and subsequently accessing. During the initial registration, the IDP program 114 may select the alias from the IDP database 116 that the user selected to be used with that particular third-party service. For example, the user may wish to create a Pinterest® account. The user may set up an alias with the IDP program 114 and indicate that the created alias should be used when creating a Pinterest® account. The IDP program 114 may determine that the user is using the Pinterest® application and provide the user's alias associated with Pinterest®.

The IDP 104 may be used to store, in the IDP database 116, the user's personal data and its associated alias. The IDP database 116 may store one or a multiple number of aliases for one or more users. For example, the user may wish to use only one alias for all third-party registrations. As such, the user may use the IDP 104 to create an alias and store the alias in the IDP database 116. The user may then use the alias to create the Pinterest® account. Alternatively, the user may select different aliases for different third-party registrations, or even multiple aliases for one particular third-party registration.

The third-party server 106 may include a third-party database 118. The third-party server 106 may be a remote server capable of communicating with the user device 102 and the IDP 104 via the network 108. The third-party server 106 may be a server that is associated with a third party. For example, the third party may be Pinterest®, the third-party server 106 may be Pinterest's® server and the third-party database 118 may be Pinterest's® database.

Figure 2:
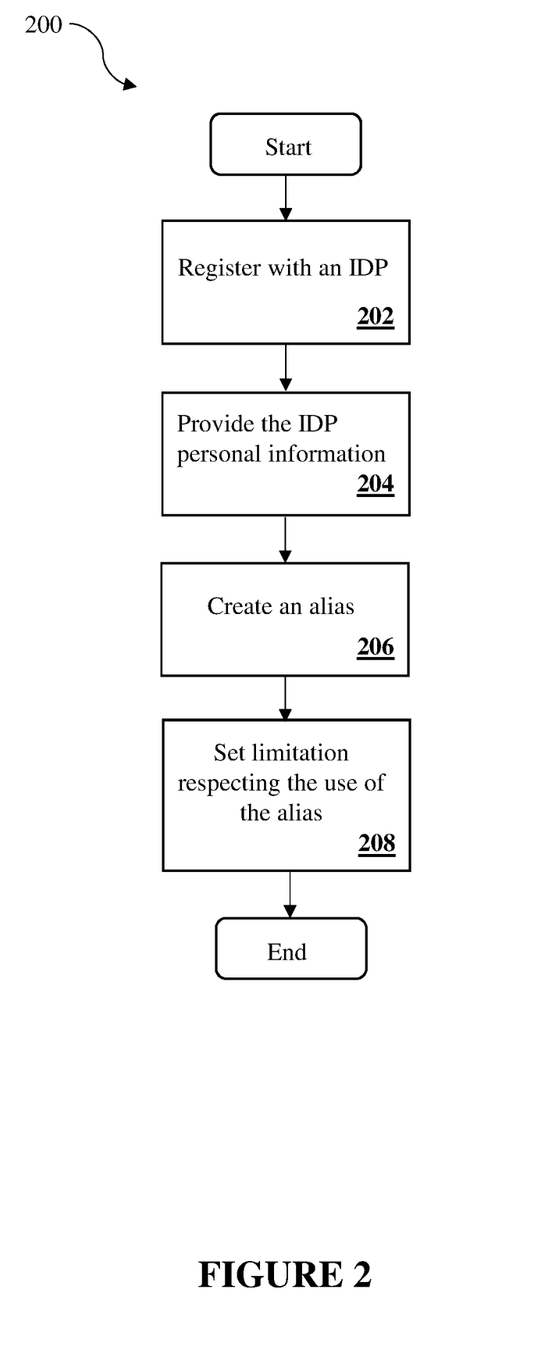
FIG. 2 is a flow diagram illustrating a method for creating an alias, in accordance with an embodiment of the invention.

Referring to FIG. 2, a method 200 for creating an alias is depicted, in accordance with an embodiment of the present invention.

Referring to operation 202, the user sets up an account with an IDP 104 by registering. During the registration process, the user provides the IDP 104 with the user's log in credentials, such as, for example, the user's name and email address. For example, the user may access the IDP 104 by using the IDP's application or website, provide the IDP 104 the user's name and email address, and create an IDP account. Once registered, the user may elect to stay logged on to the IDP 104 or may elect to log on every time the user wishes to create a new alias or modify the existing alias stored in the IDP database 116.

Referring to operation 204, once logged onto the IDP 104, the user provides the IDP 104 the user's personal information. The user's personal information may also refer to the user's personal data. For example, the user provides the IDP 104 with their personal information by filling out an online form that asks for that personal information. Personal information may refer to the user's name, mailing address, phone number, email address, social security number, or any other information that is unique and important to the user. The IDP 104 may store the user's personal information in the IDP database 116.

Referring to operation 206, the user creates an alias. The alias may be the user's personal information that is altered in some way. The user may create an alias where every piece of the user's personal information is aliased. For example, the user's personal information includes the user's name, email address, and telephone number. The user may create an alias that includes an alternate name, an alternate email address, and an alternate telephone number. Optionally, the user may create an alias where only a select piece of the user's personal information is aliased. For example, the user may create an alias by aliasing the user's name but not the user's phone number, or the user may create an alias by aliasing the user's name and phone number but not the user's email address.

Referring to operation 208, the user sets parameters or preferences respecting the use of the alias. As described herein with reference to FIG. 1, the IDP database 116 may store one or more aliases for the user. The user may set up a parameter that may specify which alias may be used for what particular third-party registration. The parameter may also be associated with limiting the privileges to the alias and the information associated with it for certain third parties. For example, the user may elect to not receive any emails from a specific third party for a certain period of time. However, when the user was registering with that third party, the IDP 104 used an alias that included an alternate email address. Therefore, if the third-party server 106 sends a request to the IDP 104 to email the user within that time period, the IDP 104 may deny the request. The user's wish to not receive any emails from that particular third party would be enforced. The third party would not be able to contact the user by emailing the user's personal email because the third party does not have the user's personal data. The IDP 104 will not share the user's personal data with the third party. As such, the third party may be prevented from obtaining the user's personal email.

Another parameter may be associated with allowing the IDP 104 to forward emails, phone calls, or any other type of communication, from certain third parties to the user's personal email, phone number, or mailing address. For example, the user may create an alias that the user may wish to use when creating a third-party registration with Pinterest®. The alias may have an alternate name and phone number but no email address. In an event that Pinterest® needs to contact the user, Pinterest® may send a request to the IDP 104 to have Pinterest's® message or communication relayed or forwarded to the user. Since the IDP 104 contains the personal data of the user, including the user's real email address, the IDP 104 can map the alias provided by Pinterest® to the real email address owned by the user and forward Pinterest's® content.

Yet another parameter may prevent certain alias information from being provided to or shared with the third-party. For example, the user may set up an alias where a portion of the information, such as, for example, the user phone number, is the real phone number of the user and the remaining information, such as, for example, the name and email address of the user is altered. The created alias may have an alternate name, alternate email, and real phone number of the user. Further, the user may wish to prevent a certain third-party from accessing the phone number. As such, the user may set up a preference with the IDP 104, indicating that only a portion of the alias, such as, for example, the name and email address may be provided by the IDP 104 to the third party. Therefore, when queried by the third party for the user's information, the IDP 104 may provide the third party the alternate name and alternate email, but not the real phone number. In an alternative embodiment of the invention, the user may set up a parameter that allows the third party to receive all information associated with an alias. In such a case, the third party may receive not only the alternate name and email address, but also the phone number that the user associated with the alias.

Figure 3:
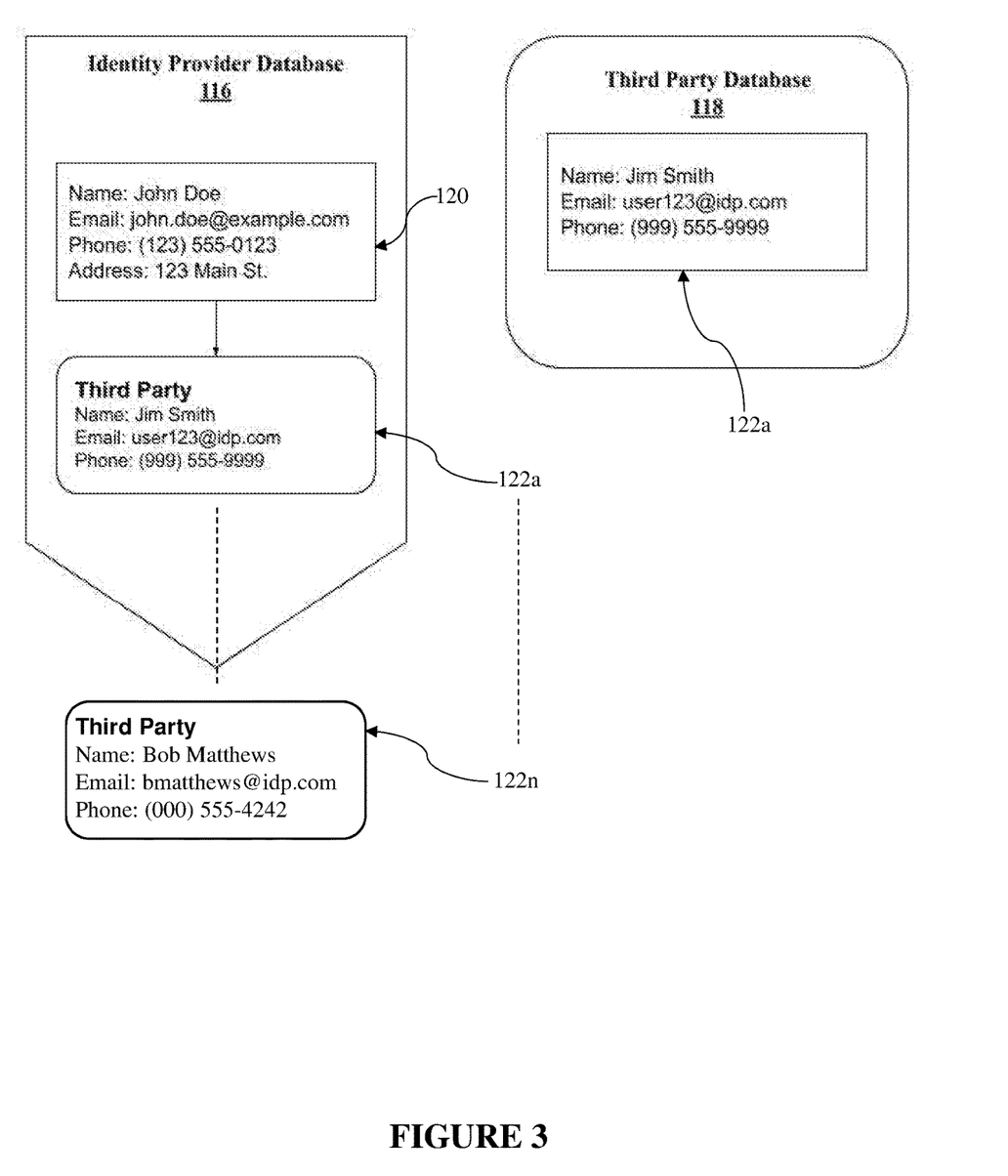
FIG. 3 is a schematic block diagram illustrating an example IDP database and a third-party database, in accordance with an embodiment of the invention.

Referring to FIG. 3, a schematic diagram illustrating an example IDP database 116 and an example third-party database 118, in accordance with an embodiment of the present invention. The IDP database 116 may include the user's personal data 120 and one or more aliases 122a-n. As described above with reference to FIGS. 1 and 2, the user may create many aliases 122a-n. Alias 122a-n may have information associated with it that is alternate to the personal data of the user. The alias 122 may then be used to finalize the third-party registration. For example, the personal data 120 of the user indicates that the user's real name is John Doe, his email address is john.doe@example.com, his phone number is (123) 555-0123, and his address is 123 Main Street. The user also created an alias 122a that has an alternate name (Jim Smith), email (user123@idp.com), and phone number (999-555-9999). This alias 122a may be used to create the third-party registration that the user wishes to set up. During the third-party registration, such as registering for a Pinterest® account, only the alias 122 is communicated to the third party and stored at the third-party database 118 (the Pinterest® database). The third-party database does not receive the user's personal data 120 nor does it have access to it.

In another example, the user may use the alias 122n to create a third-party registration with a different third party, such as Snapchat®. In yet another example, the user may use the alias 122n to create yet another Pinterest® account. As such, the user may have two third-party accounts for the same third-party where one account is associated with alias 122a and the other account is associated with alias 122n.

When the user creates multiple aliases 122, there may be N:1 mapping of aliases 122 to the user. Besides the user, the IDP 104 may be the only entity that knows the appropriate mapping between the alias 122 and the user's personal data 120. Moreover, the N:1 mapping allows the user to be known or recognized by each third party by different identifying information. This may deter correlation of account data in an event where multiple third parties, for which the user is registered, suffer data breaches and have account information leaked. For example, the user created a Pinterest® account using information relating to alias 122a and a Snapchat® account using information relating to alias 122n. As such, the user is known as "Jim Smith" on Pinterest® and "Bob Matthews" on Snapchat®. If both of these third-party sites suffer data breaches, it may be difficult to determine that "Jim Smith" and "Bob Matthews" refer to the same user, even in situations where the data breach leaks all information associated with both names. The user is unidentifiable because the alias 122a of "Jim Smith" and the alias 122n of "Bob Matthews" have no information that is common to both.

In an embodiment of the present invention, the user may use the IDP 104 to create the alias 122, store the alias 122 in the IDP database 116, and indicate which alias 122 should be used for what third-party registration. In an alternative embodiment of the present invention, the user may use the IDP 104 to create the alias 122 and store the alias 122 in the IDP database 116. However, the IDP 104 may then choose which alias may be used for any given third-party registration. The IDP 104 may chose any give alias 122 randomly. Optionally, the IDP 104 may choose the alias 122 in the order of the alias' creation, choosing the first created alias 122 to finalize the first third-party registration that the user wishes to create using the IDP 104.

Figure 4:
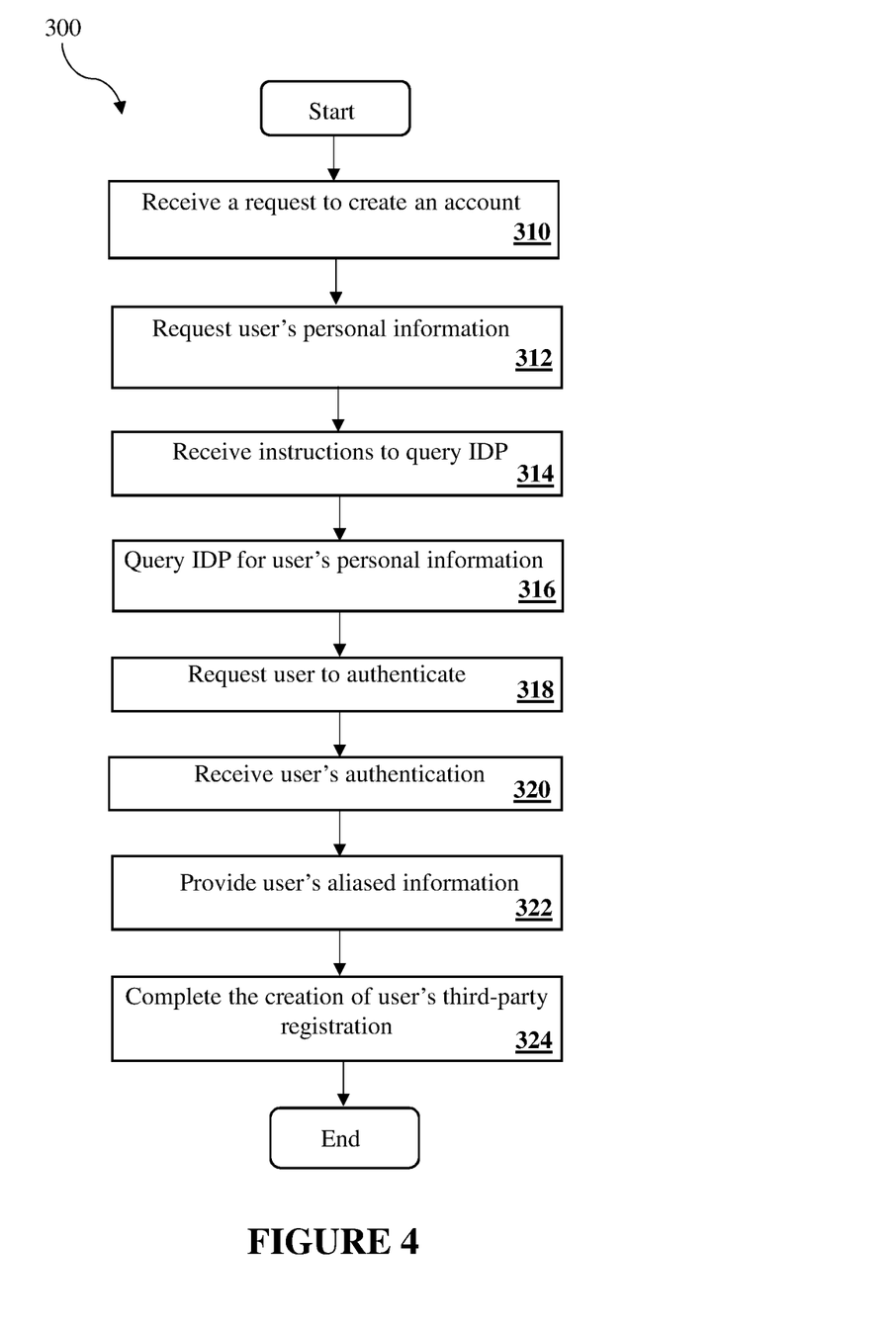
FIG. 4 is a flow chart illustrating an example method for protecting user data while performing third-party account registration, in accordance with an embodiment of the invention.

Referring to FIG. 4, a method 300 for protecting user data while performing third-party account registration is depicted, in accordance with an embodiment of the present invention. As described herein with continued reference to FIGS. 2 and 3, the user may store the user's personal data 120 in an IDP database 116 and may associate one or more aliases 122 with that personal data 120. The user may also provide the IDP 104 with additional criteria such as which third party is allowed access to any given alias 122.

Referring to operation 310, the third party receives, from the user, a request to create an account. The creation of the account corresponds with the creation of a third-party registration. For example, as described herein with reference to FIG. 2, the user may wish to create a Pinterest® account. The user may either use the Pinterest® application or go onto the Pinterest® website to initiate the creation of the third-party registration.

Referring to operation 312, the third-party server 106 prompts the user for the user's personal data 120. The request may be displayed on the user interface of 110. When the user is asked to provide the user's personal data 120, the user informs the third-party server 106 that the user is utilizing an IDP 104 and instructs the third-party server 106, at operation 314, to query the IDP 104 for the information sought. This may take the form of a button, for example, in the third-party server's application or website that the user may click to indicate that they wish to use an IDP 104 to input personal information. This button may be similar to buttons that are currently in use on many websites and applications to delegate user authentication, such as those that indicate, for example, "Sign in using Twitter" or "Sign in with Facebook". In an alternative embodiment, the user may supply a URL to the third-party server 106 that points to the IDP 104 that the user wishes to use. That URL may be unique to the user. In an alternative embodiment, the user may supply a token to the third-party server 106. The token may be a string of characters and may include information that identifies which IDP 104 the user intends to use.

Referring to operation 316, the third-party server 106 queries the IDP 104 for the information it needs. Each third-party server 106 may ask for different information. For example, one third-party server 106 may ask for the full name of the user and the user's email address. Another third-party server 106 may also ask for the telephone number or the mailing address of the user. Yet another third-party server 106 may ask for the user's telephone number and the mailing address.

Before the IDP 104 releases the alias 122 created for that particular third party, the IDP 104, at operation 318, requests that the user authenticate the request received by the IDP 104 from the third-party server 106. For example, the IDP 104 may request the user to authenticate by displaying, on the user interface 110, a message indicating the alias 122 and asking the user to verify the use of that alias 122 for the third party that is asking for the information. The user authentication of operation 318 ensures that the IDP 104 gets confirmation that the user is truly authorizing the information exchange with the third-party server 106.

Referring to operation 320, the IDP receives the user's authentication. Once the IDP 104 receives the user's authentication, the IDP provides the third-party server 106, at operation 322, the alias 122.

Referring to operation 324, once the third-party server 106 receives the alias 122 from the IDP 104, the third-party server 106 completes the creation of the third-party registration and stores the alias 122 in its own third-party database 118. For example, the third-party may automatically populate the registration form with the alias 122 received from the IDP 104 and display, on the user interface 110, the third-party account registration credentials assigned to the user.

Figure 5:
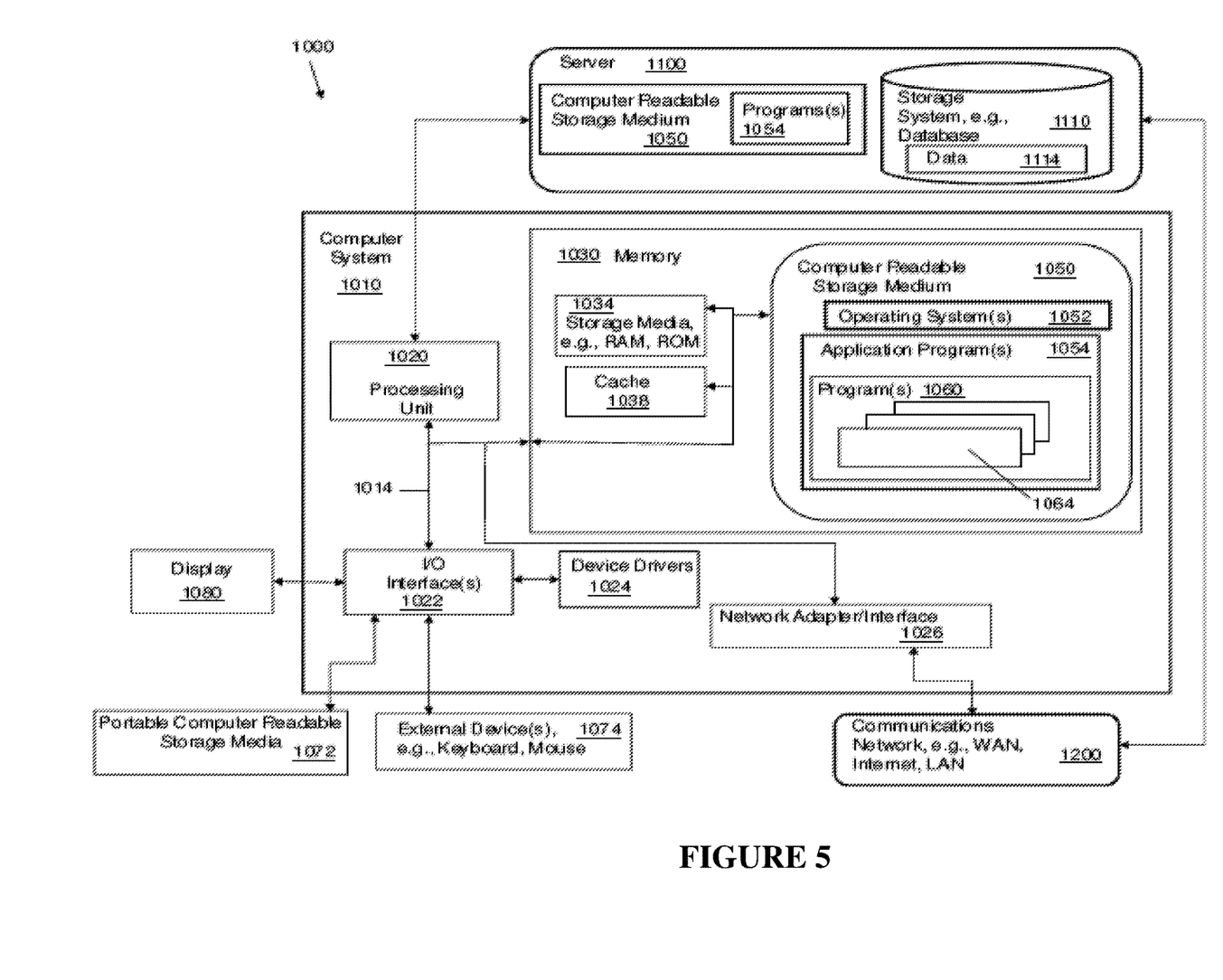
FIG. 5 is a block diagram depicting the hardware components of a system for protecting visible content, in accordance with an embodiment of the invention.

Referring to FIG. 5, a system 1000 includes a computer system or computer 1010 shown in the form of a generic computing device. The methods 200 and 300, for example, may be embodied in a program(s) 1060 (FIG. 5) embodied on a computer readable storage device, for example, generally referred to as memory 1030 and more specifically, computer readable storage medium 1050 as shown in FIG. 5. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 5 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 5 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 5, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The methods 200 and 300 (FIG. 2 and FIG. 4), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
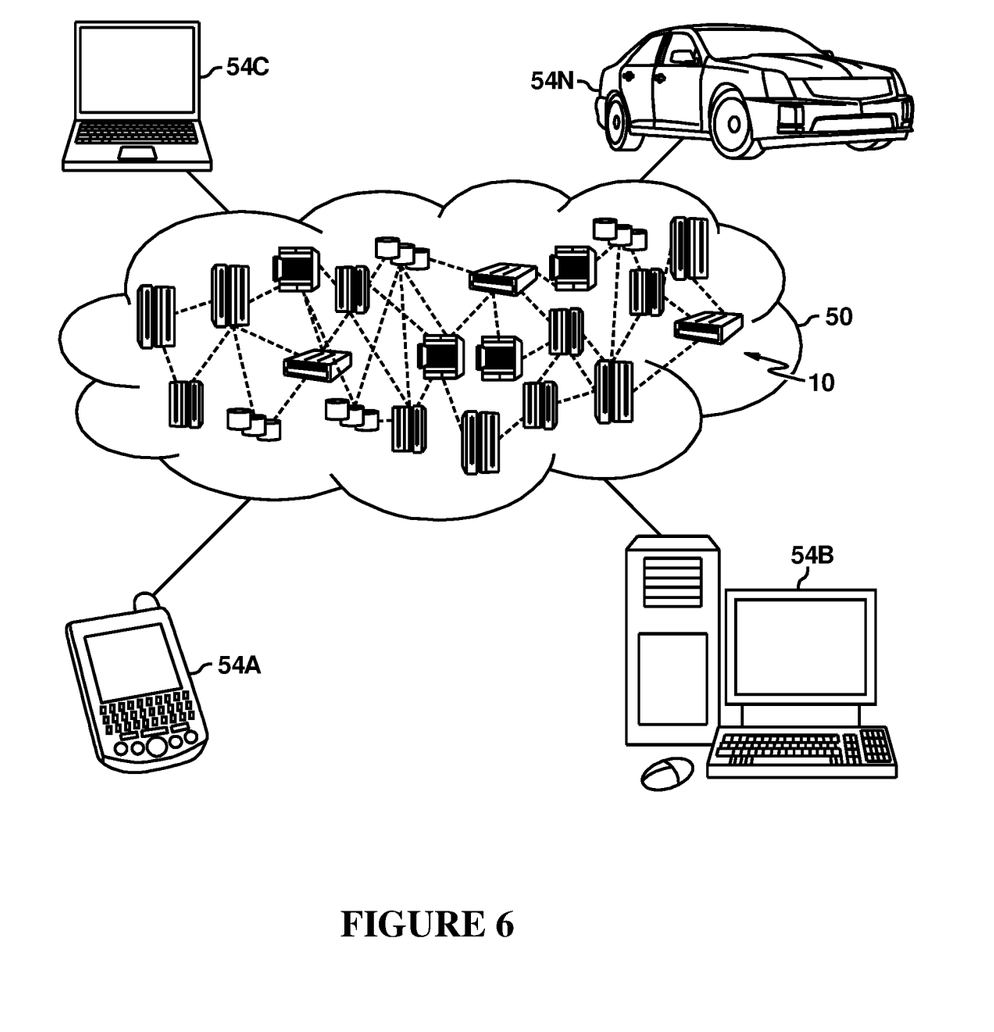
FIG. 6 is a functional block diagram depicting a cloud computing environment, in accordance with an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
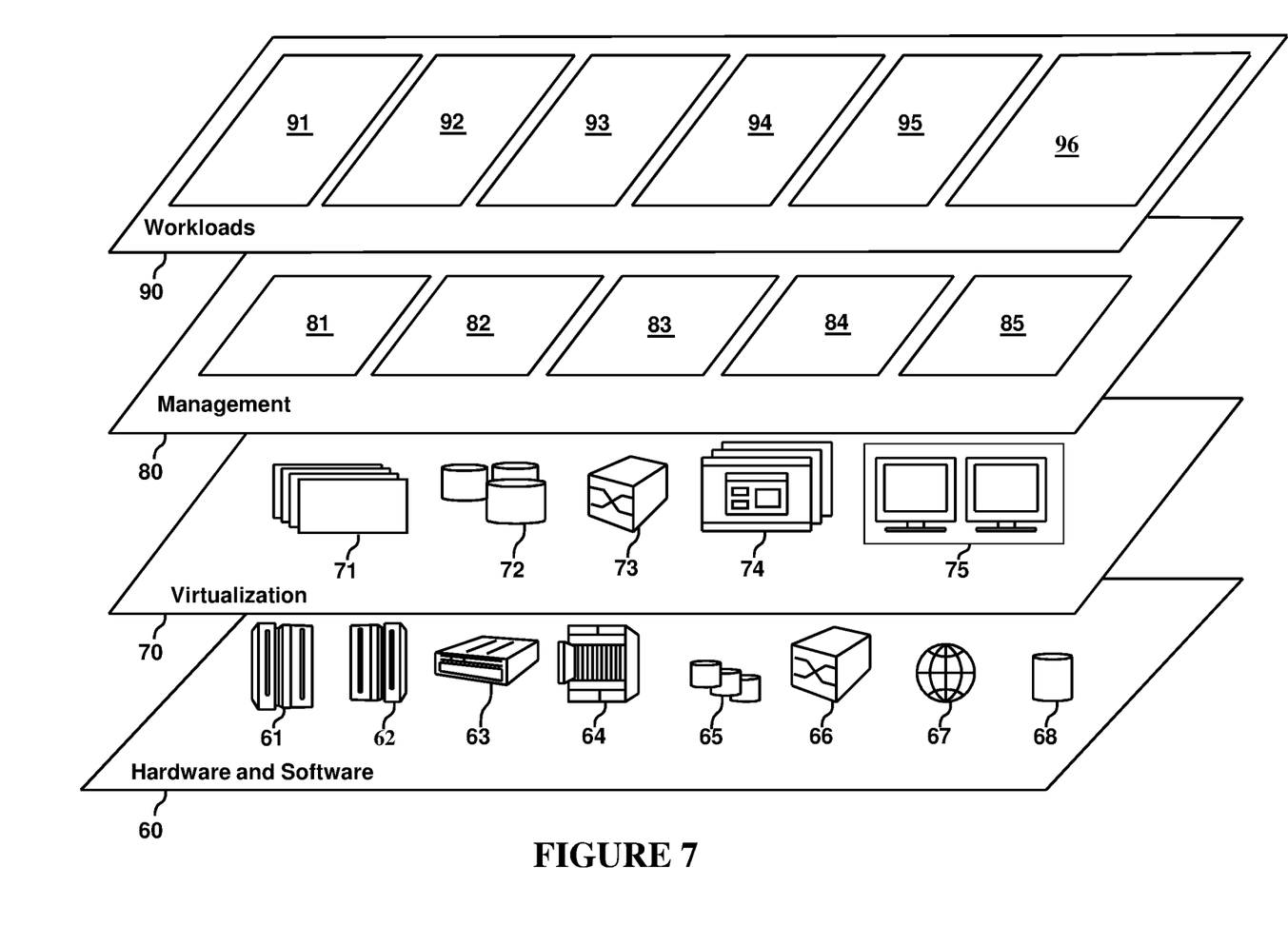
FIG. 7 is a diagram depicting abstraction model layers provided by the cloud computing environment of FIG. 6, in accordance with an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and protecting personal data 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for protecting user data while performing third-party account registration, comprising:
   receiving personal data from a user;
   creating a plurality of alias data of the user by altering the personal data of the user, wherein the plurality of the alias data created using an identity provider;
   receiving from a third party a request for the personal data of the user;
   requesting the user to authenticate the request for the personal data;
   receiving from the user an authentication; and
   in response to receiving from the user the authentication, providing the third party randomly selected one of the plurality of the alias data of the user.

2. The method of claim 1, wherein the portion of the personal data that is provided to the third party is the personal data that is partially altered.

3. The method of claim 1, further comprising:
   receiving the personal data from the user;
   receiving the portion of the personal data that is altered; and
   mapping to the user the portion of the personal data that is altered.

4. The method of claim 1, further comprising:
   storing identifying information about the third party.

5. The method of claim 1, further comprising:
   receiving from the user a parameter respecting use of the portion of the personal data that is altered.

6. The method of claim 5, wherein the parameter limits the third party from obtaining information from the portion of the personal data that is altered.

7. The method of claim 1, further comprising:
   receiving from the user a parameter, wherein the parameter allows use of personal data of the user; and
   using the personal data to forward communication to the user from the third party.

8. A computer system for protecting user data while performing third-party account registration, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   receiving personal data from a user;
   creating a plurality of alias data of the user by altering the personal data of the user, wherein the plurality of the alias data created using an identity provider;
   receiving from a third party a request for the personal data of the user;
   requesting the user to authenticate the request for the personal data;
   receiving from the user an authentication; and
   in response to receiving from the user the authentication, providing the third party randomly selected one of the plurality of the alias data of the user.

9. The computer system of claim 8, wherein the portion of the personal data that is provided to the third party is the personal data that is partially altered.

10. The computer system of claim 8, further comprising:
    receiving the personal data from the user;
    receiving the portion of the personal data that is altered; and
    mapping to the user the portion of the personal data that is altered.

11. The computer system of claim 8, further comprising:
    storing identifying information about the third party.

12. The computer system of claim 8, further comprising:
    receiving from the user a parameter respecting use of the portion of the personal data that is altered.

13. The computer system of claim 12, wherein the parameter limits the third party from obtaining information from the portion of the personal data that is altered.

14. A computer program product for protecting user data while performing third-party account registration, comprising:
    one or more computer-readable tangible storage media and program instructions stored on at least one of the one or more computer-readable tangible storage media, the program instructions executable by a processor to cause the processor to perform a method comprising:
    receiving personal data from a user;
    creating a plurality of alias data of the user by altering the personal data of the user, wherein the plurality of the alias data created using an identity provider;
    receiving from a third party a request for the personal data of the user;
    requesting the user to authenticate the request for the personal data;
    receiving from the user an authentication; and
    in response to receiving from the user the authentication, providing the third party randomly selected one of the plurality of the alias data of the user.

15. The computer program product of claim 14, wherein the portion of the personal data that is provided to the third party is the personal data that is partially altered.

16. The computer program product of claim 14, further comprising:
    receiving the personal data from the user;
    receiving the portion of the personal data that is altered; and
    mapping to the user the portion of the personal data that is altered.

17. The computer program product of claim 14, further comprising:
    storing identifying information about the third party.

18. The computer program product of claim 14, further comprising:
    receiving from the user a parameter respecting use of the portion of the personal data that is altered.

19. The computer program product of claim 18, wherein the parameter limits the third party from obtaining information from the portion of the personal data that is altered.

20. The computer program product of claim 14, further comprising:
- receiving from the user a parameter, wherein the parameter allows use of personal data of the user; and
- using the personal data to forward communication to the user from the third party.

\* \* \* \* \*